United States Patent
Hata

(10) Patent No.: US 6,774,538 B2
(45) Date of Patent: Aug. 10, 2004

(54) MULTI-DEGREE-OF-FREEDOM DRIVE MECHANISM

(75) Inventor: Yoshiaki Hata, Ashiya (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/199,711

(22) Filed: Jul. 19, 2002

(65) Prior Publication Data

US 2003/0015940 A1 Jan. 23, 2003

(30) Foreign Application Priority Data

Jul. 23, 2001 (JP) ......................................... 2001-221333

(51) Int. Cl.[7] .............................................. H02N 2/00
(52) U.S. Cl. .................................. 310/328; 310/323.17
(58) Field of Search ............................. 310/323.17, 328

(56) References Cited

U.S. PATENT DOCUMENTS

| | | | | |
|---|---|---|---|---|
| 4,132,318 A | * | 1/1979 | Wang et al. | 414/591 |
| 5,136,201 A | * | 8/1992 | Culp | 310/328 |
| 5,642,679 A | * | 7/1997 | Monget et al. | 112/470.13 |
| 6,211,607 B1 | * | 4/2001 | Kanbara | 310/328 |
| 6,349,604 B1 | * | 2/2002 | Byun et al. | 73/862.043 |
| 6,424,077 B1 | * | 7/2002 | Hata et al. | 310/328 |

FOREIGN PATENT DOCUMENTS

| | | |
|---|---|---|
| JP | 63-11074 | 1/1988 |
| JP | 4-69070 | 3/1992 |
| JP | 7-274544 | 10/1995 |
| JP | 2002-095274 A | 3/2002 |

* cited by examiner

*Primary Examiner*—Thomas M. Dougherty
(74) *Attorney, Agent, or Firm*—Sidley Austin Brown & Wood LLP

(57) ABSTRACT

In order to provide a multi-degree-of-freedom drive mechanism which is capable of preventing a malfunction with a simple structure, the multi-degree-of-freedom drive mechanism includes at least two first and second actuators which generate lengthwise resonance in drive shafts by means of electro-mechanical transducers in a state that driven members are frictionally engaged with the drive shafts to which the electro-mechanical transducers are fixed at its one end, respectively, so as to be capable of moving the driven members along the drive shafts. The other end of the drive shaft of the second actuator is fixed to the driven member of the first actuator 10 directly or via another actuator, and the first and second actuators are composed so that resonating frequencies of their drive shafts are different from each other.

10 Claims, 4 Drawing Sheets to the driven member of the first actuator directly or via another actuator, and the first and second actuators are composed so that resonating frequencies of the respective drive shafts are different from each other.

MULTI-DEGREE-OF-FREEDOM DRIVE MECHANISM

This application is based on application No. JP2001-221333 filed in Japan, the content of which is hereby incorporated by reference.

BACKGROUND OF THE INVENTION

1. Field of the Invention

The present invention relates to a multi-degree-of-freedom drive mechanism which is improved. More concretely, the invention relates to the multi-degree-of-freedom drive mechanism which is improved by using an electro-mechanical transducer.

2. Description of the Related Art

There suggests an actuator in which one end of a drive shaft is fixed and an electro-mechanical transducer is connected to the other end, a lengthwise resonance is generated in the drive shaft by the electro-mechanical transducer, and a slider spring-jointed to the drive shaft is driven along the drive shaft. Since this kind of actuator is fixed at an opposite side to the electro-mechanical transducer, the fixed section can be strengthen, and the actuator is suitable to the case where a plurality of actuators are combined so as to compose a multi-degree-of-freedom drive mechanism. For example, when one end of the drive shaft of a second actuator is fixed to a slider of a first actuator, a slider of the second actuator can be driven with two degrees of freedom by electro-mechanical transducers of the first and second actuators.

However, when the same type of actuators are connected to be used, a malfunction, such that oscillation which is generated by driving one actuator is transmitted to the other actuator and although an electro-mechanical transducer of the other actuator is not driven, a slider of the other actuator moves, occasionally occurs.

In order to prevent such a malfunction, there considers a method of inserting a shock absorbing member between the slider and the drive shaft when the actuators are connected. However, when the shock absorbing member is inserted, the structure becomes complicated, and this causes a deterioration of rigidity and increases of the cost of parts and assembly cost in a whole drive mechanism.

OBJECTS AND SUMMARY

The present invention is devised in order to solve the above problem, and its object is to provide a multi-degree-of-freedom drive mechanism which is improved. More concretely, it is an object of the present invention to provide a multi-degree-of-freedom drive mechanism which is improved by using an electro-mechanical transducer. More concretely, it is an object of the present invention to provide a multi-degree-of-freedom drive mechanism which is capable of preventing a malfunction with a simple structure.

In order to achieve the above object and another objects, a multi-degree-of-freedom drive mechanism according to one aspect of the present invention includes at least two first and second actuators which have: an electro-mechanical transducer; a drive shaft to which the electro-mechanical transducer is fixed at its one end; and a driven member which is frictionally engaged with the drive shaft, and which generate lengthwise resonance in the drive shaft by means of the electro-mechanical transducer so as to be capable of moving the driven member along the drive shaft, wherein the other end of the drive shaft of the second actuator is fixed to the driven member of the first actuator directly or via another actuator, and the first and second actuators are composed so that resonating frequencies of the respective drive shafts are different from each other.

In the above structure, when the actuator suitably drives the electro-mechanical transducer with a drive frequency at which lengthwise resonance is generated in the drive shaft, the drive shaft oscillates at different speeds according to expansion and contraction, for example, and the driven member which is frictionally engaged with the drive shaft moves along the drive shaft. The electro-mechanical transducer is an element, such as a piezoelectric element, magnetostrictive element, electrostrictive element or electrostatic actuator, which can transduce an electric energy (for example, voltage, electric current, electric field, electric charge, static electricity, magnetic field, etc.) into a mechanical energy (for example, deformation and distortion such as expansion and contraction, dilatation, curving, or twisting).

According to the above structure, when the resonating frequencies of the first and second actuators are made to be suitably different and one actuator is driven, oscillation is not generated in the drive shaft of the other actuator due to oscillation of one actuator, so that a malfunction can be prevented. In order to make the resonating frequencies different, for example, length, density, elastic modules and damping coefficient are made to be different between the drive shafts, or the masses are made to be different between the electro-mechanical transducers. Namely, the structures of the actuators do not have the same structure, and thus a special member such as a shock absorbing member is not required.

Therefore, a malfunction can be prevented by the simple structure.

In the multi-degree-of-freedom drive mechanism according to another aspect of the present invention, the respective actuators drive the electro-mechanical transducers with drive frequencies included in the resonating frequencies of the drive shafts or resonating frequencies bands in the vicinity of the resonating frequencies, respectively, and the drive frequency of the first actuator is out of the resonating frequency band of the second actuator including the drive frequency of the second actuator, and the drive frequency of the second actuator is out of the resonating frequency band of the first actuator including the drive frequency of the first actuator.

As for the drive frequencies of the actuators, the resonating points with degrees where resonance of the drive shafts becomes as large as possible are selected and the drive frequencies are set at the resonating points or their vicinities, so that the actuators can be driven efficiently. However, in this case, an actuator is easily resonated due to the oscillation of another actuator. With the above structure, since the drive frequencies of the actuators do not close to each other, when one actuator is driven, the other actuator can be prevented from malfunctioning.

In the multi-degree-of-freedom drive mechanism according to another aspect of the present invention, the drive frequency with which the first actuator is driven is out of the resonating frequency band of the second actuator with a different degree from that of the above resonating frequency band of the second actuator including the above drive frequency of the second actuator, and the drive frequency with which the second actuator is driven is out of the resonating frequency band of the first actuator with a different degree from that of the above resonating frequency band of the first actuator including the above drive frequency of the first actuator.

Even if the drive frequency of one actuator is not included in the resonating frequency band including the drive frequency of the other actuator, when it is included in the resonating frequency band with another degree of the other actuator, the other actuator occasionally malfunctions. With the above structure, since the drive frequency of an actuator is not included in a resonating frequency band with another degree, a malfunction can be prevented more securely.

In the above structures, the resonating frequency bandwidth can be determined suitable per degree.

Moreover, in the multi-degree-of-freedom drive mechanism according to another aspect, the respective resonating frequency bands include frequencies in the vicinity of the resonating frequencies where an amplitude not less than $1/\sqrt{2}$ times as large as the maximum amplitude in the resonating frequencies is given to the drive shafts of the actuators.

In the above structure, the amplitude becomes not less than $1/\sqrt{2}$ times as large as the maximum amplitude in the resonating frequency bands, and an oscillation energy becomes not less than half of that at the resonating point. With the above structure, the resonating frequency bandwidth can be set to be narrow when the resonance is sharp and to be wide when the resonance is not sharp. Therefore, the resonating frequency bandwidth can be set quantitatively and reasonably according to the sharpness of the resonance.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawing.

DETAILED DESCRIPTION OF THE PREFERRED EMBODIMENTS

Figure 1:
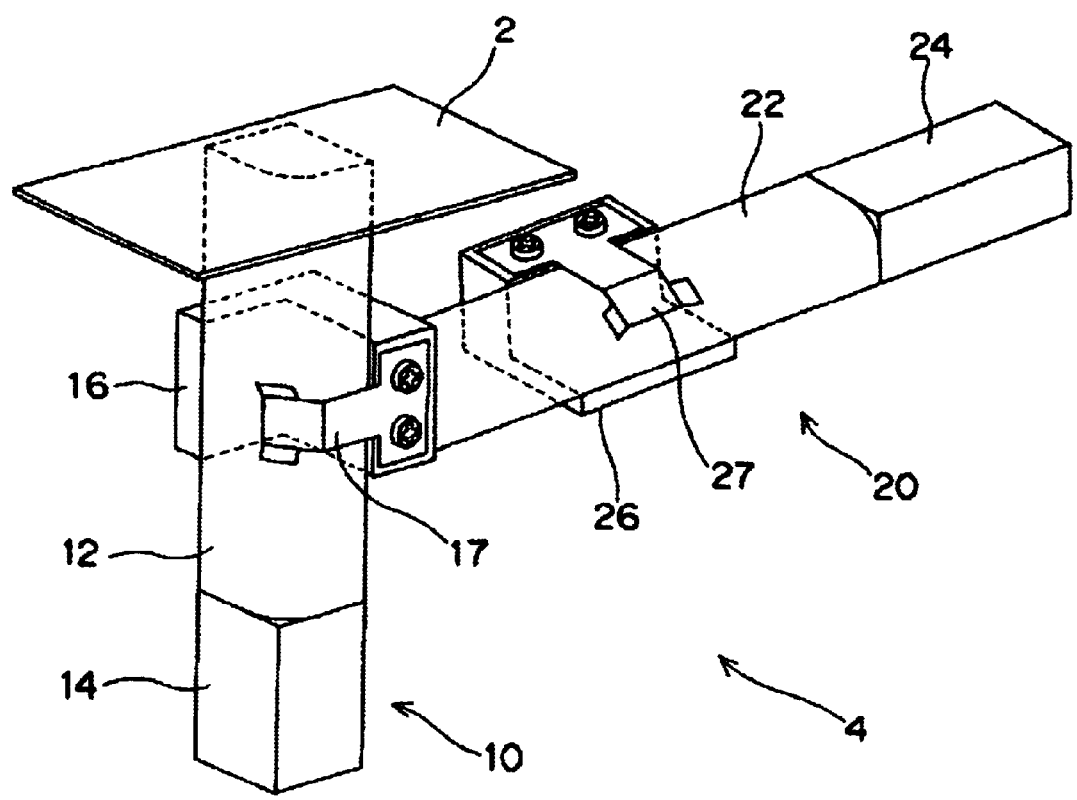
FIG. 1 is a perspective view of a multi-degree-of-freedom drive mechanism according to one embodiment of the present invention.

There will be explained below embodiments of the present invention with reference to FIGS. 1 and 2.

Firstly, one example will be explained based on FIG. 1 as an embodiment of the present invention.

A multi-degree-of-freedom drive mechanism 4 is a two-degree-of-freedom drive mechanism in which two actuators 10 and 20 are connected directly.

A base end of a drive shaft 12 of the first actuator 10 is fixed to a fixing section 2. For example, the fixing is carried out by an adhesive, a mechanical method using a screw and press fitting or welding. An electro-mechanical transducer 14 is fixed to an end of the drive shaft 12. A slider 16 is frictionally engaged with the drive shaft 12 so as to be capable of moving along the drive shaft 12. Namely, two surfaces of the slider 16 are contact-bonded to two surfaces of a drive shaft 12 slidably by an energizing force of a plate spring 17 screwed to the slider 16, so that the position of the slider 16 is maintained.

The second actuator 20 having the same structure as that of the first actuator is fixed to a side surface of the slider 16. Namely, abase end of the drive shaft 22 of the second actuator 20 is fixed. An electro-mechanical transducer 24 is fixed to an end of the drive shaft 22. A slider 26 is frictionally engaged with the drive shaft 22 by a plate spring 27.

As mentioned later more concretely, suitable drive pulses are applied to the electro-mechanical transducers 14 and 24, respectively, so that the sliders 16 and 26 can be moved independently.

Since the slider 26 of the second actuator 20 moves to a different direction from a moving direction of the slider 16 of the first actuator 10, the first actuator 10 and the second actuator 20 are driven so that the slider 26 of the second actuator 20 can be moved with two degrees of freedom.

When actuators are added similarly, a drive mechanism in which a degree of freedom is further increased can be constituted.

Figure 2:
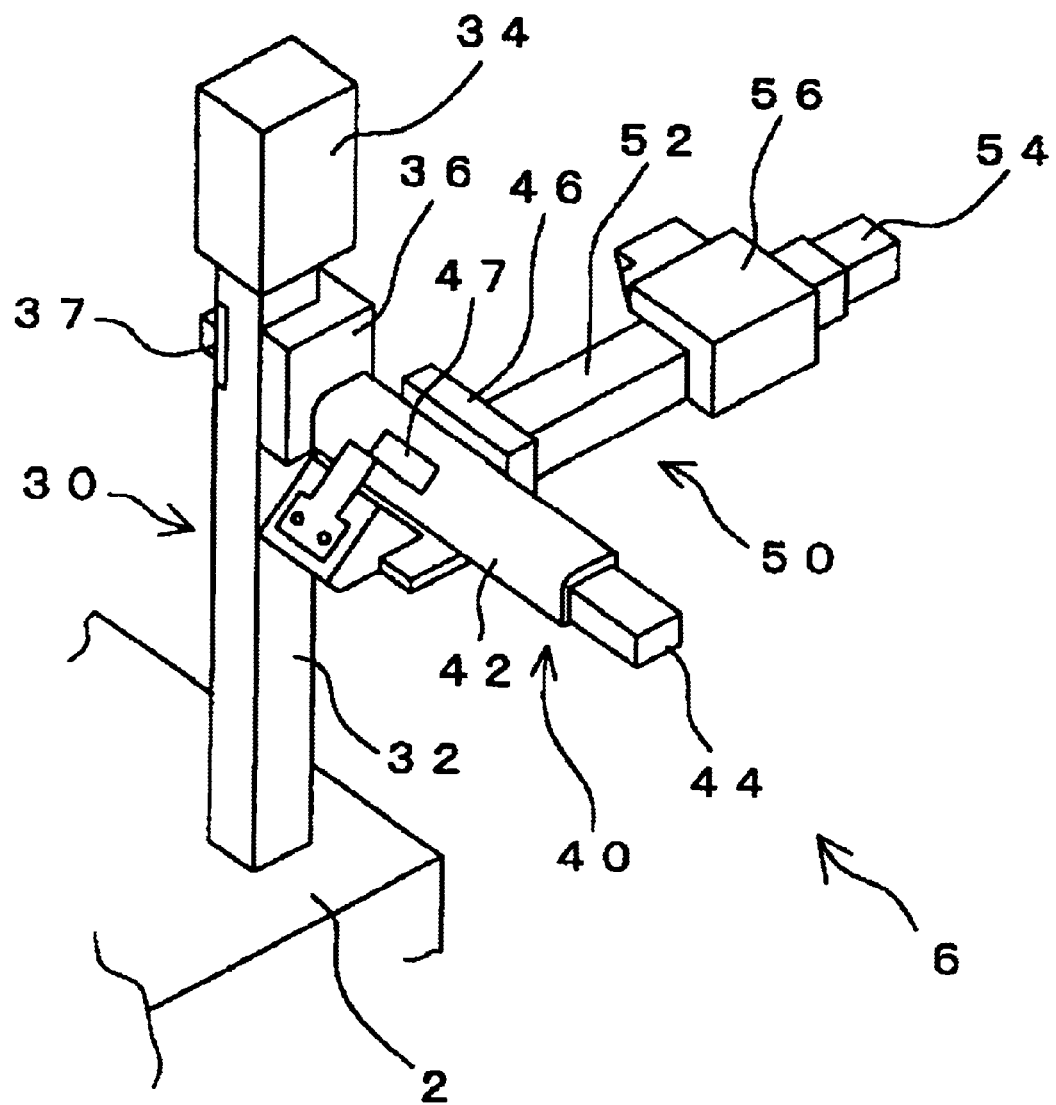
FIG. 2 is a perspective view of a multi-degree-of-freedom drive mechanism of a modified example.

FIG. 2 shows a multi-degree-of-freedom drive mechanism 6 of a modified example. The multi-degree-of-freedom drive mechanism 6 is a three-degree-of-freedom drive mechanism in which three actuators 30, 40 and 50 are connected.

The respective actuators 30, 40 and 50 have the same structure, and electro-mechanical transducers 34, 44 and 54 are fixed to ends of the drive shafts 32, 42 and 52, respectively. Sliders 36, 46 and 56 to which plate springs 37, 47 and 57 (not shown) are screwed, respectively, are frictionally engaged with the drive shafts 32, 42 and 52, respectively by forces of the plate springs 37, 47 and 57 (not shown).

A base end of the drive shaft 32 of the actuator 30 on the fixed side is fixed to the fixing section 2. A base end of the drive shaft 42 of the middle actuator 40 is fixed to a side surface of the slider 36 of the actuator 30 on the fixed side. A base end of the drive shaft 52 of the actuator 50 on the drive side is fixed to a side surface of the slider 46 of the middle actuator 40. Namely, the actuators 30 and 50 on the fixed side and the drive side are coupled via the middle actuator 40.

In the above multi-degree-of-freedom drive mechanisms 4 and 6, suitable drive pulses are applied to the electro-mechanical transducers 14, 24, 34, 44 and 54 of the actuators 10, 20, 30, 40 and 50, and oscillations to the axial direction having different speeds of expansion and contraction are generated in the drive shafts 12, 22, 32, 42 and 52, so that the sliders 16, 26, 36, 46 and 56 can be moved. For example, when the drive shafts 12, 22, 32, 42 and 52 are displaced relatively and gently, the sliders 16, 26, 36, 46 and 56 are moved by the displacement. When the drive shafts 12, 22, 32, 42 and 52 are displaced to the opposite direction relatively and abruptly, slipping occurs between the sliders 16, 26, 36, 46, 56 and the drive shafts 12, 22, 32, 42, 52 in a state that the sliders 16, 26, 36, 46 and 56 are in a substantially still state, and when this is repeated, the sliders 16, 26, 36, 46 and 56 move along the drive shafts 12, 22, 32, 42 and 52.

As a drive pulse, for example, a voltage having a sawtooth waveform composed of gentle leading (or trailing) and abrupt trailing (or leading) or a rectangular waveform with suitable duty ratio is applied.

The individual actuators 10, 20, 30, 40 and 50 can be driven by deforming the electro-mechanical transducers 14, 24, 34, 44 and 54 with a frequency where the drive shafts 12, 22, 32, 42 and 52 of the actuators 10, 20, 30, 40 and 50 resonate or with a frequency in the vicinity of the resonating frequency in respective systems (namely, a system where a base end of one drive shaft is fixed and the electro-mechanical transducer is fixed to the end of the drive shaft).

The resonating frequencies of the individual actuators 10, 20, 30, 40 and 50 in the respective systems are determined by the respective structures. In order to prevent a malfunction due to oscillation caused by driving another actuators, the respective actuators 10, 20, 30, 40 and 50 are constituted so that the resonating frequencies are separated suitably, and drive frequencies are selected. For example, shapes (length, thickness, etc.) and materials (density, elastic modulus, damping coefficient, etc.) of the drive shafts 12 and 22 are made to be different from each other, or masses of the electro-mechanical transducers 14, 24, 34, 44 and 54 are made to be different from one another. As for the drive frequency, the resonating frequency of suitable degree or a frequency in the vicinity of the resonating frequency can be selected according to the structures and specifications of the actuators 10, 20, 30, 40 and 50.

When the actuators 10, 20, 30, 40 and 50 are constituted so as to provide the difference in the frequencies in such a manner, addition of parts such as shock absorbing members and an assembly work due to the addition of parts are not required, and the rigidity of the mechanism is not deteriorated.

As the difference in the frequencies is larger, a malfunction is prevented more effectively, but it is not advantageous to increase the difference more than needs in order to limit the shape, structure and specification of the actuators.

A difference in the frequencies which is required to prevent a malfunction changes according to sharpness of resonance of the drive shafts of the actuators. In the case where the resonance is sharp, a malfunction can be prevented with small difference in the frequencies, and in the case where the resonance is not sharp, the frequencies should be made to be more different.

As an amount which represents the sharpness of the resonance, there is a Q coefficient which is defined by the following equation.

$$Q = \omega_n / (\omega_2 - \omega_1) \tag{1}$$

Here, $\omega_n$ is a resonating frequency of the oscillation system, $\omega_1$ is a frequency where a frequency of forcible oscillation is lowered from $\omega_n$ and an oscillation amplitude becomes $1/\sqrt{2}$ of an amplitude at the resonating point, and $\omega_2$ is a frequency where the frequency of the forcible oscillation is raised from $\omega_n$ and the oscillation amplitude becomes $1/\sqrt{2}$ of the amplitude at the resonating point. A point at which the amplitude which is $1/\sqrt{2}$ of the maximum amplitude is given is called as a half power point, and an oscillation energy becomes half of the resonating point. Even if $\omega_n$ is the same, when the resonance is sharp, $\omega_2 - \omega_1$ becomes small, and when the resonance is not sharp, $\omega_2 - \omega_1$ becomes large.

From the resonating point of the drive shaft of the actuator to the half power point, the amplitude with respect to the forcible oscillation abruptly drops, and after the half power point, the drop of the amplitude becomes gentle. Therefore, in the case where a malfunction is prevented by making the resonating frequencies of the drive shafts between the actuators different, it is effective that the drive frequency of an actuator is not included in frequencies between half power points on both sides of the resonating point of another actuators (resonating frequency band between the half power points).

When the frequencies are made to be different in such a manner, a malfunction can be prevented without limiting the shape, the structure and the specification of the actuators more than needs.

There are a plurality of resonating frequencies of the drive shaft in the actuator from a primary mode to higher mode, but frequencies are made to be different for the resonating frequencies in arbitrary mode of the drive shafts of the respective actuators.

As for the actuators which are not adjacent to each other, since oscillation to be transmitted is attenuated, the multi-degree-of-freedom drive mechanism can be constituted without making the frequencies different.

As explained above, the simple structure that the resonating frequencies are made to be different among the actuators 10, 20, 30, 40 and 50 can prevent a malfunction of the multi-degree-of-freedom drive mechanisms 4 and 6.

The present invention is not limited to the above embodiment and can be carried out in various forms.

Next, there will be explained below the concrete structure of the multi-degree-of-freedom drive mechanism 6 in FIG. 2.

The drive shafts 32, 42 and 52 were formed into a prismatic shape by using fiber reinforced resin containing 50% by volume of carbon fiber. One corner which engages with a spring was formed into a curved surface with a radius of 2.5 mm. Dimensions of the drive shafts 32, 42 and 52 are 4.5 mm×4.5 mm×40 mm, 3.5 mm×3.5 mm×20 mm and 3.5 mm×3.5 mm×25 mm, respectively. Young's modules of elasticity in the drive shafts 32, 42 and 52 are about 0.7 times as much as that of metal (iron), and their density is about ¼ times as much as that of electro-mechanical transducers 34, 44 and 54.

As the electro-mechanical transducers 34, 44 and 54, laminated-type piezoelectric elements using PZT [Pb (Zr, Ti) O₃] as a piezoelectric material, were used. Sections of the electro-mechanical transducers 34, 44 and 45 are quadrate. Their dimensions are 6 mm×6 mm×10 mm, 3 mm×3 mm×5 mm and 3 mm×3 mm×5 mm, respectively. A drive pulse with a drive frequency of about 70 kHz was applied to the electro-mechanical transducer 34, a drive pulse with a drive frequency of about 120 kHz was applied to the electro-mechanical transducer 44, and a drive pulse with a drive frequency of about 100 kHz was applied to the electro-mechanical transducer 54, so that the respective actuators 30, 40 and 50 could be driven without malfunctions of the actuators.

Figure 4:
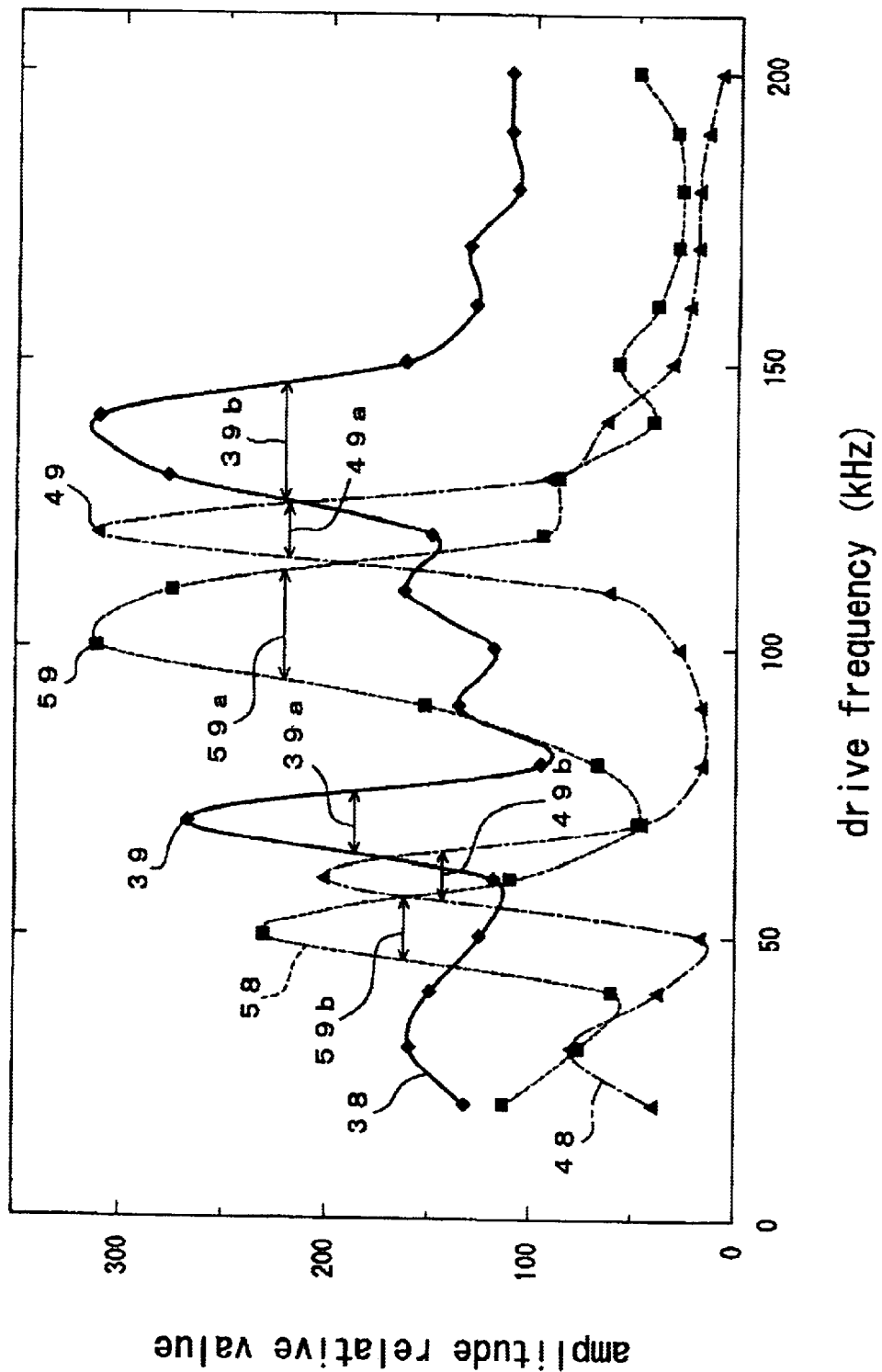
FIG. 4 is a diagram showing the oscillation characteristics of the multi-degree-of-freedom drive mechanism in FIG. 2.

FIG. 4 shows results of measuring the oscillation characteristics of the actuators 30, 40 and 50.

Figure 3:
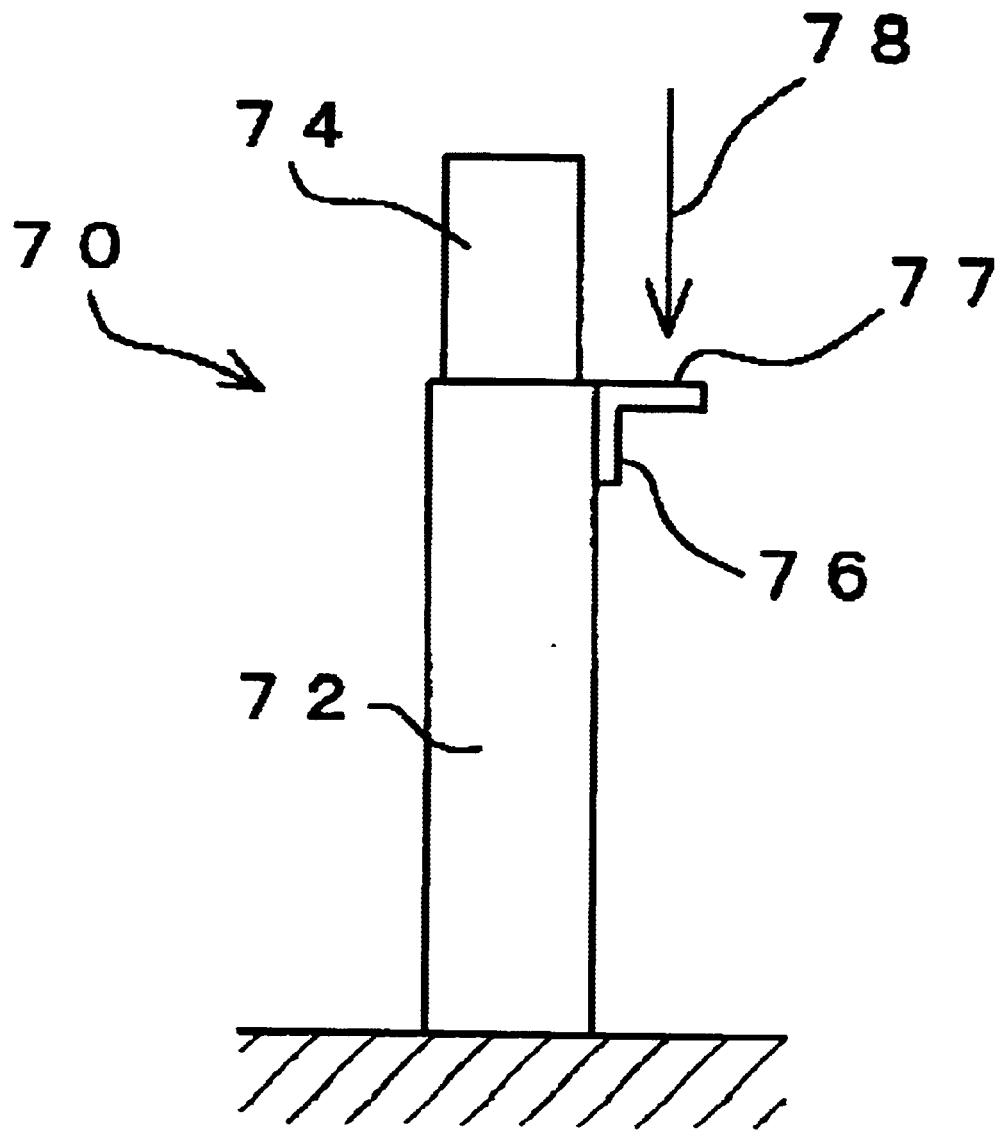
FIG. 3 is an explanatory diagram showing a measuring method of an oscillation characteristics.

The oscillation characteristics were measured for the respective actuators 30, 40 and 50. Namely, as shown in FIG. 3, in an actuator 70 from which a slider is removed, an electro-mechanical transducer 74 faced upward and a lower end of a drive shaft 72 was grounded, and an L-shaped reflecting member 77 was provided on a boundary between the electro-mechanical transducer 74 and the drive shaft 72. As shown by an arrow 78, a laser was emitted from the above onto the reflecting surface 77 so that an amplitude in the axial direction was Doppler-measured.

In FIG. 4, in order to make the heights of oscillation characteristic curved lines 38, 48 and 58 of the actuators 30, 40 and 50 uniform, a vertical axis is shown by amplitude relative value. Reference numerals 39a, 39b; 49a, 49b; 59a, 59b show resonating frequency bands between the half power points on both sides of main resonating points (primary and secondary resonating points), namely, frequency bands where the amplitude becomes not less than $1/\sqrt{2}$ times as large as the maximum amplitude at the resonating point (hereinafter, referred to as "main resonating frequency band").

The actuator 30 on the fixed side is driven with a frequency around a primary resonating point 39. The actuators 40 and 50 on the middle and drive sides are driven with frequencies around secondary resonating points 49 and 59.

As is clear from FIG. 4, the drive frequency of the actuator 30 on the fixed side (about 70 kHz) is separated from the main resonating frequency bands 49a and 49b of the adjacent middle actuator 40. Similarly, the drive frequency of the middle actuator 40 (about 120 kHz) is separated from the main resonating frequency bands 39a, 39b; 59a, 59b of the actuators 30, 50 on the fixed and drive sides. Similarly the drive frequency of the actuator 50 on the drive side (about 100 kHz) is separated from the main resonating frequency bands 49a, 49b of the adjacent middle actuator 40.

Further, the drive frequency of the actuator 30 on the fixed side (about 70 kHz) is separated also from the main resonating frequency bands 59a, 59b of the actuator 50 on the drive side which is not adjacent. Similarly, the drive frequency of the actuator 50 on the drive side (about 100 kHz) is separated also from the main resonating frequency bands 39a, 39b of the actuator 30 on the fixed side which is not adjacent.

The oscillation characteristic curved lines are not abrupt at the higher resonating points, and the actuators cannot be driven, so that a malfunction should not be considered.

As mentioned above, when the resonating frequencies are suitably made to be different between plural actuators and a certain actuator is driven, oscillation does not occur in the drive shafts of another actuators due to the oscillation of the actuator, so that a malfunction can be prevented by the simple structure.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A multi-degree-of-freedom drive mechanism comprising:
    first actuator including:
        first electro-mechanical transducer;
        first drive shaft to which the first electro-mechanical transducer is fixed at its one end; and
        first driven member which is frictionally engaged with the first drive shaft, and
        which generating lengthwise resonance in the first drive shaft by means of the first electro-mechanical transducer so as to be capable of moving the first driven member along the first drive shaft,
    second actuator including:
        second electro-mechanical transducer;
        second drive shaft to which the second electro-mechanical transducer is fixed at its one end; and
        second driven member which is frictionally engaged with the second drive shaft, and
        which generating lengthwise resonance in the second drive shaft by means of the second electro-mechanical transducer so as to be capable of moving the second driven member along the second drive shaft,
    wherein the other end of the second drive shaft of the second actuator is fixed to the first driven member of the first actuator directly or via another actuator, and the first and second actuators are composed so that resonating frequencies of the respective drive shafts are different from each other.

2. A multi-degree-of-freedom drive mechanism according to claim 1, wherein
    the respective resonating frequency bands include frequencies in the vicinity of the resonating frequencies where an amplitude not less than $1/\sqrt{2}$ times as large as the maximum amplitude in the resonating frequencies is given to the drive shafts of the actuators.

3. A multi-degree-of-freedom drive mechanism according to claim 1, wherein
    the respective electro-mechanical transducers are driven with drive frequencies included in the resonating frequencies of the drive shafts or resonating frequencies bands in the vicinity of the resonating frequencies, respectively, and
    the drive frequency of the first actuator is out of the resonating frequency band of the second actuator including the drive frequency of the second actuator, and the drive frequency of the second actuator is out of the resonating frequency band of the first actuator including the drive frequency of the first actuator.

4. A multi-degree-of-freedom drive mechanism according to claim 3, wherein
    the respective resonating frequency bands include frequencies in the vicinity of the resonating frequencies where an amplitude not less than $1/\sqrt{2}$ times as large as the maximum amplitude in the resonating frequencies is given to the drive shafts of the actuators.

5. A multi-degree-of-freedom drive mechanism according to claim 3, wherein
    the drive frequency with which the first actuator is driven is out of the resonating frequency band of the second actuator with a different degree from that of the said resonating frequency band of the second actuator including the said drive frequency of the second actuator, and the drive frequency with which the second actuator is driven is out of the resonating frequency band of the first actuator with a different degree from that of the said resonating frequency band of the first actuator including the said drive frequency of the first actuator.

6. A multi-degree-of-freedom drive mechanism according to claim 5, wherein
    the respective resonating frequency bands include frequencies in the vicinity of the resonating frequencies where an amplitude not less than $1/\sqrt{2}$ times as large as the maximum amplitude in the resonating frequencies is given to the drive shafts of the actuators.

7. A method for driving a multi-degree-of-freedom drive mechanism including at least two first and second actuators which having: an electro-mechanical transducer, a drive shaft to which the electro-mechanical transducer is fixed at its one end; and a driven member which is frictionally engaged with the drive shaft, and which generating lengthwise resonance in the drive shaft by means of the electro-mechanical transducer so as to be capable of moving the driven member along the drive shaft, wherein the other end of the drive shaft of the second actuator is fixed to the driven member of the first actuator directly or via another actuator, said method comprising the steps of:
    driving the first actuator at first resonating frequency of the first drive shaft, and
    driving the second actuator at second resonating frequency of the second drive shaft,
    wherein first and second resonating frequencies are different from each other.

8. A method for driving a multi-degree-of-freedom drive mechanism according to claim 7, wherein the respective electro-mechanical transducers are driven with drive frequencies included in the resonating frequencies of the drive shafts or resonating frequencies bands in the vicinity of the resonating frequencies, respectively, and the drive frequency of the first actuator is out of the resonating frequency band of the second actuator including the drive frequency of the second actuator, and the drive frequency of the second actuator is out of the resonating frequency band of the first actuator including the drive frequency of the first actuator.

9. A method for driving a multi-degree-of-freedom drive mechanism according to claim 7, wherein the drive frequency with which the first actuator is driven is out of the resonating frequency band of the second actuator with a different degree from that of the said resonating frequency band of the second actuator including the said drive frequency of the second actuator, and the drive frequency with which the second actuator is driven is out of the resonating frequency band of the first actuator with a different degree from that of the said resonating frequency band of the first actuator including the said drive frequency of the first actuator.

10. A method for driving a multi-degree-of-freedom drive mechanism according to claim 7, wherein the respective resonating frequency bands include frequencies in the vicinity of the resonating frequencies where an amplitude not less than $1/\sqrt{2}$ times as large as the maximum amplitude in the resonating frequencies is given to the drive shafts of the actuators.

* * * * *